3,406,030
METHOD FOR THE PRODUCTION OF A HARD-POROSITY LIME-SILICA POROUS BODY
Rolland Perraudin, Bagnolet, Claude Perrin, Paris, and Georges Seris, Antony, France, assignors to L'Air Liquide, Societe Anonyme pour l'Etude et l'Exploitation des Procedes Georges Claude
No Drawing. Continuation-in-part of application Ser. No. 339,319, Jan. 22, 1964. This application Mar. 27, 1967, Ser. No. 625,950
Claims priority, application France, Feb. 8, 1963, 924,155; Sept. 11, 1963, 947,141
8 Claims. (Cl. 106—86)

ABSTRACT OF THE DISCLOSURE

A method for manufacturing a high-porosity lime-silica porous body suitable particularly for storing dissolved gas which includes the heating of cylinders in an autoclave under autogenic pressure, said cylinders being filled with an aqueous slurry comprising a mixture of finely divided lime, silica, asbestos fibers and an organic suspending agent, with no gelling point under the conditions of reaction, in amounts between about 0.3% and about 10% by weight of the porous body after the heating, said aqueous slurry being free from entrapped air.

---

This application is a continuation-in-part of applicants' application Ser. No. 339,319, filed Jan. 22, 1964, for "Method for the Production of a High-Porosity Lime-Silica Porous Body," now abandoned.

This invention relates to a high-porosity lime-silica porous body for vessels used for storing dissolved gases, more particularly acetylene.

It is well known that when a porous lime-silica porous body is prepared, the slurry made of a dispersion of silica, lime and asbestos in a large amount of water has a tendency to settle, and that a layer of water forms rapidly above it. This occurrence is particularly undesirable since, on the one hand, the water content varies according to the resting time in vats before use and, on the other hand, the vessels which are usually in the shape of elongated cylinders being filled with the slurry, the composition of the latter varies according to the time elapsed before cooking. The porosity of the porous body is then too high in the upper part of the vessel and too low in the lower part of the same. A vacuum is even sometimes obtained in the upper part of the vessel and the porous body very often shows many gaps near the top of the vessel.

Several remedies have been suggested, more particularly, the stabilization of the slurry before it is cooked through the addition of inorganic suspending agents, such as colloidal alumina, bentonite and aluminum salts, etc.

In another known method, the slurry is mixed with aluminum powder while being stabilized through the adjunction of small amounts of ethyl cellulose to avoid the settling of the metal and heterogeneous distribution of the reaction products.

In both the above methods, the inorganic suspending agents are inadequate stabilizers and their efficiency is low.

The use of "colloidal" lime is described in French Patent No. 1,219,720 of Apr. 3, 1959, to avoid this settling of the slurry. However, this method requires the use of a colloidal mill controlled with the utmost accuracy, which involves some difficulties notably the necessity of frequent adjustments and repairs of the colloidal mill due to the rapid wear of the latter.

The method of this invention makes it possible to obtain a stable slurry at room temperature. This stabilized slurry, prior to any other treatment, is readily stored, as well as the containing cylinders, so as to effect the cooking of the day's run in one operation in an autoclave.

The object of this invention is to obtain full stabilization at room temperature, allowing storage until the introduction into the autoclave, and during the often slow operation of filling which involves the addition of a certain amount of suspending agent. Stabilization at elevated temperatures is not aimed at since a very fast heating makes it useless.

All organic suspending agents do not allow the conditions of reaction determined by the invention. Thus when the slurry cooked in the autoclave contains a suspending agent the viscosity of which increases with the temperature, such as alkyl cellulose, there results from 70°–90° C. upwards a gelation which gives a very high consistency owing to the amount of organic agent used.

The gelation of the slurry has disadvantages for carrying out the method of the invention. During the cooking, the cylinders are cooked with a porous plug which lets out the expanding water, the slurry being held inside the cylinder. When a gelling substance is used, the porous plug is clogged and the hydrostatic pressure rises which entails a risk of pushing the cylinders out of shape. In the presence of a suspending agent giving a fluid slurry, the reaction is already much slowed down. With a gelling substance, the reaction is even more slowed down, which leads to excessively long cooking times, unwarranted in commercial practice.

The method of this invention makes it possible to obtain a slurry based on a mixture of finely divided silica and lime, reaching the required degree of stabilization at room temperature and sufficiently fluid for the time of reaction to be acceptable.

The method comprises the addition of an organic suspending agent with no gelling point in amounts between about 0.3% and about 10% by weight of the lime-silica porous body obtained after cooking.

It has indeed been found that the viscosity of the organic suspending agent plays a major part in the production of a slurry fully stabilized at room temperature and not giving a very high consistency from the outset of the rise in temperature owing to the amount of suspending agent added.

Suitable organic agents for carrying out the method of this invention are compounds which show decreasing viscosity when the temperature rises, i.e. with higher viscosities at lower temperatures.

The organic suspending agent is preferably a member of the group comprising the alkyl silicates, notably ethyl silicate. It is also a member of the group consisting of the hydroxyalkyl celluloses more particularly hydroxyethyl celluloses and ethyl hydroxyethyl celluloses, and a member of the group consisting of polyvinyl alcohols.

Moreover, it has been found that the use of small amounts of organic suspending agents makes it possible to obtain excellent stabilization of the slurry. At lower doses than the ones used in this invention, around 0.15%, it has been found that the stabilization was very inadequate and that the porous body production of vessels filled with a porous lime-silica body was impossible under such conditions. On the other hand, with 0.3% to 10% by weight of organic suspending agents, the slurry is effectively stabilized. The amount to be added varies according to the degree of stabilization required and to the nature of the suspending agent.

A novel phenomenon has been observed which occurs under the conditions of preparation according to the invention and this is when the finely divided lime and silica are intimately mixed with the organic suspending agents to obtain the lime-silica slurry, finely divided air tends to be entrapped into the slurry unless special precautions are taken to avoid this. The entrapped air gives a marked shrinkage of the porous body after cooking. To avoid this disadvantage, the slurry may be de-aerated under vacuum in a de-aerator before the cooking or the slurry may be prepared in the absence of air. Under such conditions, the slurry once cooked shows no gaps due to the presence of air in the porous body.

It has been found that the density of the slurry varies according to the content of entrapped air. For instance, with an aerated slurry densities of 1 or even 0.98 are observed, whereas with a de-aerated slurry the density is close to the theoretical value of 1.2.

The shrinkage is not only due to the presence of air in the slurry. It was formerly supposed to be linked with the lime/silica ratio in the slurry, a ratio, by weight, lime/silica=1, giving zero shrinkage and a ratio lime/silica= 1.22, giving 2.3 mm, shrinkage. An attempt has been made to verify this finding under the conditions of this invention, the ratio being varied between 1.05 and 1.55. It was then found that shrinkage was maximum for ratios between 1.22 and 1.3, but that beyond this range, the shrinkage decreased so that its value was the same for the ratios 1 and 1.5, for instance.

For production purposes, the lime/silica ratio is preferably chosen in the range giving minimum shrinkage. The lower reactivity of the mixture of slurry components due to the presence of the suspending agent involves a considerable lengthening of the cooking time. A time of 24 hours is common, under a pressure of about 9 bars, that is, at a temperature of 175° C. Without such a precaution, shrinkage appears after drying.

On the other hand, it has also been observed that, according to a variation of the invention, it is possible to produce porous bodies with very high porosities. The range of porosities now obtainable reaches about 98%.

This improvement is achieved through extending the cooking time of the slurry and/or raising the cooking temperature. This new way of carrying out the invention makes it possible to increase the crushing strength of the lime-silica body and to reduce the shrinkage, which would then be too high.

Such porous bodies with very high porosities find numerous applications in fields other than the filling of cylinders for the storage of dissolved gases, in particular acetylene. It has thus been observed that the porous bodies obtained by the above method, due to their low thermal conductivity, make excellent insulators, both at low temperatures (possibly under vacuum) and at high temperatures. In this case, the higher the porosity, the better the insulating properties.

Generally speaking, whenever one seeks a rigid medium, resisting both low and high temperatures, without any significant warping, but with physical constants approaching those of a gas or of vacuum, it will be found advantageous to use a porous body with the highest porosity consistent with the use contemplated. As an example of application, let us mention the keeping of thin walls in highly accurate geometrical positions without the positioning system having a high dielectric constant.

The materials used in making the slurry are silica, lime and asbestos. The respective proportions of silica and lime are such that they have a weight ratio between 1.10 and 1.20, preferably 1.15. The silica used is a pure substance; its granulometry is 625 mesh, which makes its particles have an average size of 10 to 30 microns. The lime used is slaked lime whose grains are 40 to 200 microns in size. The asbestos is Canadian in origin and has sufficient fiber length.

A large amount of water is used because of the final porosity desired. The amount can be 2.8 to 6.5 times the weight of the other materials, preferably 3.10 to 3.30.

Working of the aqueous slurry intended to yield by heat treatment a high porosity lime-silica body comprises several operations.

First of all, the constituents are weighed and the amounts of water are measured. The water is introduced into a mixing trough under a vacuum, then the constituents are poured in. Mixing takes place in a vacuum of 0.5 to 0.95 bar. The suspension agent is then distributed in the slurry by constant rotation. After this addition, agitation is continued for several minutes. The slurry is then finished and the bottles are filled, preferably with a slight vacuum of the order of 0.6 to 0.95 bar in the bottle. After filling, the bottle is provided with a porous plug before being introduced into the autoclave. The invention envisages the heat treatment of the bottles in an autoclave under autogenic pressure, the steam being a heating means which makes it possible to obtain an exact and homogeneous temperature in an enclosed space.

The temperature of the autoclave is brought progressively to a temperature corresponding to the boiling point of the water under the internal pressure of the autoclave, this latter being between 8 and 12 bars, preferably 9 to 10 bars, i.e. a temperature of 175 to 180° C. The slurry in the bottle allows an amount of water escape that is fairly equivalent to the increase of volume due to expansion (about 10% of the water contained). Under these conditions, the role of the porous filter is to let the water escape, while retaining the solid elements of the paste.

The heat treatment which can begin with a progressive raising of the steam pressure in the autoclave and going up to the temperature and pressure level, is continued at least 24 hours under this pressure, and can be prolonged depending on the nature of the sheet metal of the bottles. When the time has elapsed, the temperature drops naturally in the autoclave to about 100° C., and the bottles are then removed and subjected to a drying operation in an oven. The drying temperature is of the order of 280° to 300° C. the length of this temperature level depending on the size of the bottle; for bottles 130 cm. long with a capacity of 50 liters, it is about 60 hours. The density and shrinkage values are checked before use.

X-ray diffraction diagrams make it possible to determine the identity of the composition between the center and periphery of the porous body. In addition, they show that the asbestos is practically untouched and that the silica has completely disappeared in its crystallized form.

Since the heat treatment causes setting of the slurry by chemical reaction between the silica and lime which occurs gradually and leads to the formation of silicates, the drying that follows the heat treatment causes hardening of the material as the water leaves. The volume freed by water elimination is distributed in an infinity of small pores whose size, determined by the Purcell method (injection of mercury under pressure), equals diameters close to 0.1 to 1 micron.

The final desnsity of the porous mass depends on its porosity. For example, for a 91% porosity, the apparent weight of liter of porous mass will be about 250 g. For the same slurry composition used to make bottles, it is possible to observe varying densities of the porous mass depending on the amount of vacuum created during working of the slurry. A study of the variations in the density of the mass with a constant slurry composition shows that there is a correlation with the presence of air trapped in the aqueous slurry. A porous mass with a final density of 0.250 has a shrinkage of about 2 mm. for a bottle 130 cm. long; a mass with a density of 0.255, a shrinkage of the order of 1.6 mm.; a mass with a density of 0.260, i.e., prepared from a very well de-aerated slurry, a shrinkage of 0.4 mm. which drops to 0.2 mm. with a mass with a density of 0.262. These results show that the trapped air causes a considerable shrinking of the mass after heat treatment. A study of shrinkage as a function of the vacuum prevailing in the bottle during filling confirms the influence of trapped air on shrinkage. For a pressure of 0.67 bar set up in the bottle during its filling, there is observed, for example, a shrinking of 7 mm. All other things being equal, with a pressure of 0.79 bar there will be shrinking of 2.5 mm. and with a pressure of 0.92 bar, a shrinking of 0.8 mm.

As non-limitative examples, compositions are given below illustrating the method which is the subject of this invention.

EXAMPLE 1

A slurry is made containing—

|   | Parts |
|---|---|
| Silica | 33.5 |
| Slaked lime | 38.5 |
| Asbestos | 28 | in the presence of 330 parts water.

The respective proportions of silica and lime are such that the weight ratio is 1.15.

After obtaining the lime/silica milk and asbestos suspension, the final aqueous slurry is worked in a mixer working under a vacuum of the order of 0.75 to 0.8 bar, and 1.5% ethyl hydroxyethyl cellulose is put in.

The water-soluble ethyl hydroxyethyl cellulose used in this example has formulas whose molecular structure is the following:

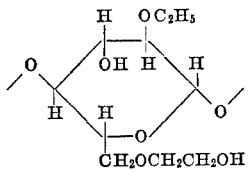

It is obtained by the action of ethylene oxide and ethyl chloride or alkali cellulose.

Aqueous solutions of ethyl hydroxyethyl cellulose are characterzed by a high viscosity. It should be noted that different viscosimeters give different readings for the viscosity.

In this example, the ethyl hydroxyethyl cellulose is the product sold under the commercial name "Modocoll E 1200"; at 22° C. (71.5° F.) the viscosity is 94 centipoises in 1% aqueous solution. "Modocoll" can be used in the form of fine granules or powder. It is soluble in alkaline solutions and in water; its properties are similar to those of methyl hydroxy ethyl cellulose. Chemical composition: ethyl radical: degree of substitution: about 0.9 and hydroxyethyl radical: degree of substitution about 0.8.

After the suspension agent has been added, agitation is continued for some minutes. The slurry, then finished, is brought to the place for filling the bottles which is performed under a vacuum of about 0.9 bar. After filling, the bottles are subjected to a heat treatment under autogenic pressure in an autoclave. The temperature of the autoclave is progressively brought to 180° C., a pressure of about 10 bars. The slurry in the bottle allows about 10% of the water to escape. Treatment continues 24 hours. The bottles are then subjected to a drying.

A perfectly homogenous porous mass with a 91% porosity, whose density is 10.250±5, is obtained.

EXAMPLE 2

The aqueous slurry intended to give, by heat treatment, a silica/lime mass with high porosity is made up of—

|   | Percent |
|---|---|
| Slaked lime | 46 |
| Silica | 40 |
| Canadian asbestos | 14 | and 5%, in relation to the weight of the raw materials, of ethyl silicate, 40% solution of $SiO_2$ in water, adding 2.85 times the weight of the water in relation to the total weight of the other materials.

Working of the aqueous slurry and filling the bottles is performed as described above. Heat treatment is carried out under 9 bars at 175° C. for 24 hours. The porosity of the mass is of the order of 89%.

EXAMPLE 3

The composition used to obtain the aqueous slurry is made up of—

|   | Percent |
|---|---|
| Slaked lime | 46 |
| Silica | 40 |
| Canadian asbestos | 14 | and 1.5% ethyl hydroxyethyl cellulose in relation to the total weight of the raw materials. Water is added in the same ratio of 2.85 times in relation to the total weight of the other materials.

Working of the slurry is performed with the technique described above; filling is of the order of 0.9 bar.

Heat treatment under 9 bars at 175° C. is maintained for 24 hours.

A porous mass with an 89% porosity is obtained.

EXAMPLE 4

A slurry is made containing—

|   | Parts |
|---|---|
| Slaked lime | 46 |
| Silica | 40 |
| Asbestos | 14 | in the presence of water so that there is 6.4 times the weight of water, in relation to the total weight of the other materials, then 3% of the weight of the raw materials, of ethyl hydroxyethyl cellulose, of the type described in Example 2.

Working of the slurry and filling the bottles is done as in the preceding examples. After heat treatment of the slurry for 24 hours under a pressure of 9 bars, at 175° C., a silica/lime porous mass with 95.3% porosity is obtained. As seen from the foregoing examples the amount of asbestos fibers may be from about 14 to 28% of the total weight of lime, silica and asbestos.

The porous masses prepared in the preceding examples have a homogeneous density, presenting no lacuna. Lengthwise sections show that these masses are sound without a lacuna and have not undergone stresses due to evacuation of the boiling water.

The resistance of these masses to compression is 15–40 bars. This resistance is a direction function of the density and shrinking: maximum resistance corresponds to a maximum density and shrinking. It has been found that ethyl silicate has an influence on resistance to compression. If a suspension agent other than ethyl silicate is added, colloidal silica can be added which produces the same effect as the ethyl silicate on resistance to compression.

Additional embodiments of the invention in this specification will occur to others and therefore it is intended that the scope of the claims limit the invention and not the embodiments described hereinabove. Accordingly, reference should be made to the following claims in determining the full scope of the invention.

What is claimed is:

1. A process for manufacturing a high-porosity lime-silica gas storage body comprising heating in an autoclave cylinder filled with an air free aqueous slurry, said heating being effected at the temperature corresponding to the temperature of boiling water at an internal pressure of from about 8 to about 12 bars and for a period of at least 24 hours, said aqueous slurry comprising a mixture of finely divided lime, silica, and asbestos fibers, the ratio by weight of silica/lime being from about 1.10 to about 1.20, the amount of water being from about 2.8 to about 6.5 times the total weight of the silica, lime and asbestos fibers, the amount of asbestos fibers being from about 14 to about 28% of the total weight of the silica, lime and asbestos fibers, the slurry further including from between about 0.3% to about 10% by weight of the lime-silica porous body obtained after said heating in an autoclave of an organic suspending agent exhibiting decreasing viscosity with increasing temperature and no gelling point when employed in the amounts and under the conditions of reaction in the autoclave.

2. The method according to claim 1 in which the suspending agent is a member of the group consisting of ethyl silicate and ethyl hydroxyethyl cellulose.

3. The method according to claim 2 in which the suspending agent is an ethyl hydroxyethyl cellulose.

4. The method according to claim 2 in which the heating is effected under a pressure between about 9 and about 10 bars, at a temperature between about 175° C. and about 180° C., the ratio by weight of silica/lime being about 1.15, the amounts of water being between about 3.10 and about 3.30 times the total weight of the raw materials.

5. The method according to claim 4 in which the suspending agent is an ethyl hydroxyethyl cellulose.

6. The method according to claim 1 which comprises de-aerating of the aqueous slurry containing the suspending agent before it is heated in the autoclave.

7. The method according to claim 1 which comprises preparing of the aqueous slurry in the absence of a gaseous atmosphere.

8. The method according to claim 3 which comprises adding of colloidal silica to the aqueous slurry.

References Cited

UNITED STATES PATENTS

| | | | |
|---|---|---|---|
| 2,883,040 | 4/1959 | Pater et al. | 106—120 |
| 3,285,756 | 11/1966 | Moren | 106—119 |

FOREIGN PATENTS

| | | |
|---|---|---|
| 144,247 | 11/1948 | Australia. |
| 236,327 | 9/1960 | Australia. |
| 633,114 | 12/1949 | Great Britain. |

OTHER REFERENCES

Rochow: Chemistry of the Silicones, John Wiley & Sons Inc., New York, 1946, pp. 12–15.

Rose et al.: The Condensed Chemical Dictionary, Reinhold Pub., New York, 6th ed., 1961, pp. 593, 920, 476, 477.

TOBIAS E. LEVOW, *Primary Examiner.*

SAMUEL E. MOTT, *Assistant Examiner.*